United States Patent
Lin

(10) Patent No.: US 6,971,490 B2
(45) Date of Patent: Dec. 6, 2005

(54) BRAKE STRUCTURE OF VEHICLE

(76) Inventor: Yu-Huan Lin, No. 52, Lane 598, Sec. 2, Chang Hsi Rd., An Nan Dist., Tainan City (TW)

( * ) Notice: Subject to any disclaimer, the term of this patent is extended or adjusted under 35 U.S.C. 154(b) by 0 days.

(21) Appl. No.: 10/770,530

(22) Filed: Feb. 4, 2004

(65) Prior Publication Data
US 2005/0167210 A1 Aug. 4, 2005

(51) Int. Cl.⁷ ............................................. F16D 65/12
(52) U.S. Cl. ......................... 188/218 XL; 188/218 R; 188/71.1
(58) Field of Search .................. 188/218 XL, 218 R, 188/81.1, 71.7

(56) References Cited

U.S. PATENT DOCUMENTS

| | | | | |
|---|---|---|---|---|
| 5,101,953 A | * | 4/1992 | Payvar | .................. 192/107 R |
| 5,474,161 A | * | 12/1995 | Eaton et al. | ............. 188/264 A |
| 6,186,293 B1 | * | 2/2001 | Beer et al. | ............. 188/218 XL |
| 6,279,698 B1 | * | 8/2001 | Oberti | .................. 188/218 XL |

* cited by examiner

Primary Examiner—Matthew C. Graham

(74) Attorney, Agent, or Firm—Troxell Law Office, PLLC

(57) ABSTRACT

A brake structure of a vehicle having a brake abrasion surface applied onto a braking device such as a brake disk, a brake drum case, a clutch housing of a stepless transmission clutch, and a clutch disk of a step transmission clutch. The brake abrasion surface has a plurality of equidistantly spaced crescent-shaped grooves whose number is variably changed depending on the application thereof in practical use. The crescent-shaped grooves thereof are partially overlapped in their ends to form a plurality of symmetrically intersecting points at the brake abrasion surface thereon. In braking operation, lining plates of the braking device are in abrasion engagement with the brake abrasion surface.

2 Claims, 6 Drawing Sheets

BRAKE STRUCTURE OF VEHICLE

BACKGROUND OF THE INVENTION

The present invention is related to a brake structure of vehicle, characterized by a brake abrasion surface applied onto a braking device such as a brake disk, or a clutch disk, etc. wherein the brake abrasion surface thereof is equidistantly defined by a plurality of crescent-shaped grooves whose number is variably changed depending on the application in practical use. The crescent-shaped grooves thereof have a plurality of symmetrically intersecting points formed at the brake abrasion surface thereon; whereby, via the crescent-shaped grooves thereof abrasively abutted against lining plates of the braking device, the frictional coefficient is increased to achieve better balance effect of the lining plates, avoiding the slipping and deviating of the lining plates in braking operation; besides, with the lining plates abrasively contacted with the intersecting points thereof, the frictional coefficient thereof is relatively augmented to a great deal, efficiently shortening the braking distance as well as boosting the driving safety and the torque output thereof.

Please refer to FIGS. 1 to 4 inclusive. A conventional brake structure of vehicle is characterized by a brake abrasion surface 11, 21, 31, 41 applied onto various kinds of braking device from a brake disk 10 and a brake drum case 20 to a clutch housing of a stepless transmission clutch 30 and a clutch disk of a step transmission clutch 40 as shown in FIGS. 1, 2, 3, 4, respectively, and driven with lining plates in braking operation. However, the brake abrasion surface 11, 21, 31, 41 thereof is made of a smooth facet that tends to increase the slipping coefficient and prolong the braking distance thereof. Thus, the lining plates thereof are easily slipped into deviation and vibration, resulting in different level of abrasion of the lining plates as well as the wheel treads thereof.

SUMMARY OF THE PRESENT INVENTION

It is, therefore, the primary purpose of the present invention to provide a brake structure of vehicle, including a brake abrasion surface applied onto a braking device such as a brake disk, or a clutch disk, etc. wherein the brake abrasion surface thereof is equidistantly defined by a plurality of crescent-shaped grooves whose number is variably changed depending on the application thereof in practical use. The crescent-shaped grooves thereof have a plurality of symmetrically intersecting points formed at the brake abrasion surface thereon; whereby, via the crescent-shaped grooves thereof abrasively abutted against lining plates of the braking device, the frictional coefficient is increased to achieve better balance effect of the lining plates, avoiding the slipping and deviating of the lining plates in braking operation; besides, with the lining plates abrasively contacted with the intersecting points thereof, the frictional coefficient thereof is relatively augmented to a great deal, efficiently shortening the braking distance as well as boosting the driving safety and the torque output thereof.

DETAILED DESCRIPTION OF THE PREFERRED EMBODIMENTS

Figure 1:
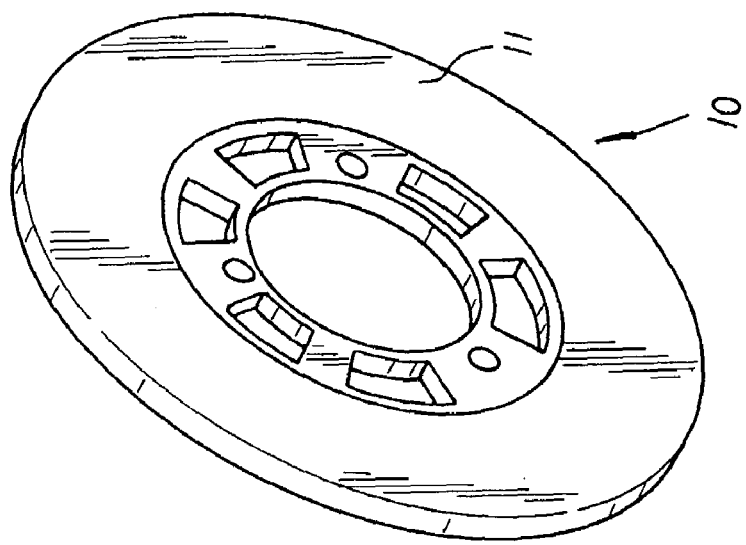
FIG. 1 is a perspective view of a conventional brake disk.
Figure 3:
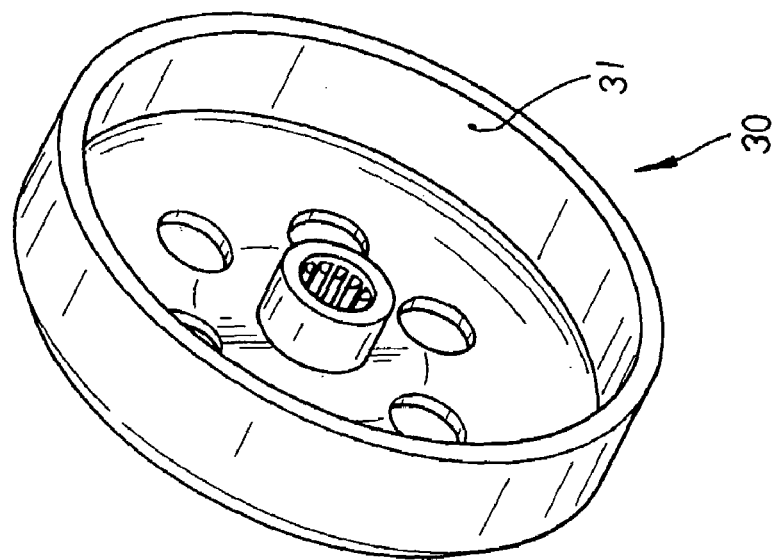
FIG. 3 is a perspective view of a conventional clutch housing of a stepless transmission clutch.
Figure 2:
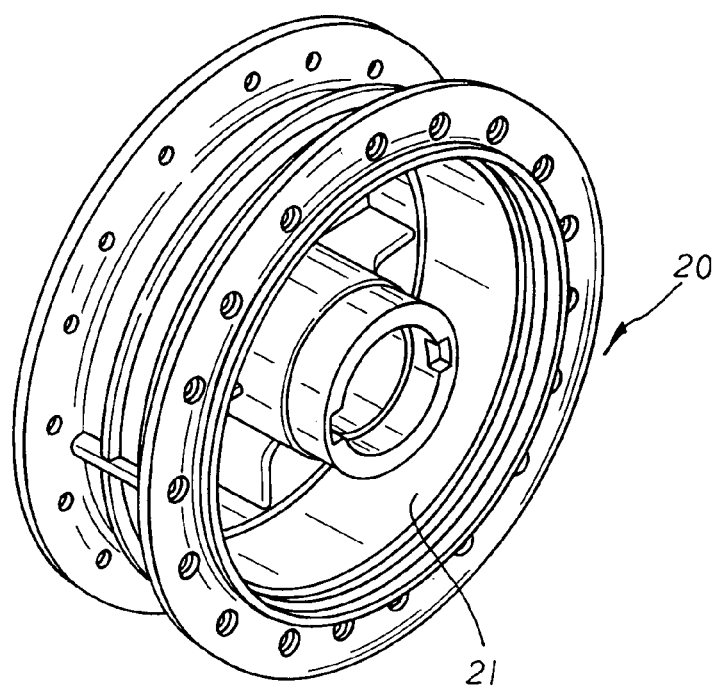
FIG. 2 is a perspective view of a conventional brake drum case.
Figure 5:
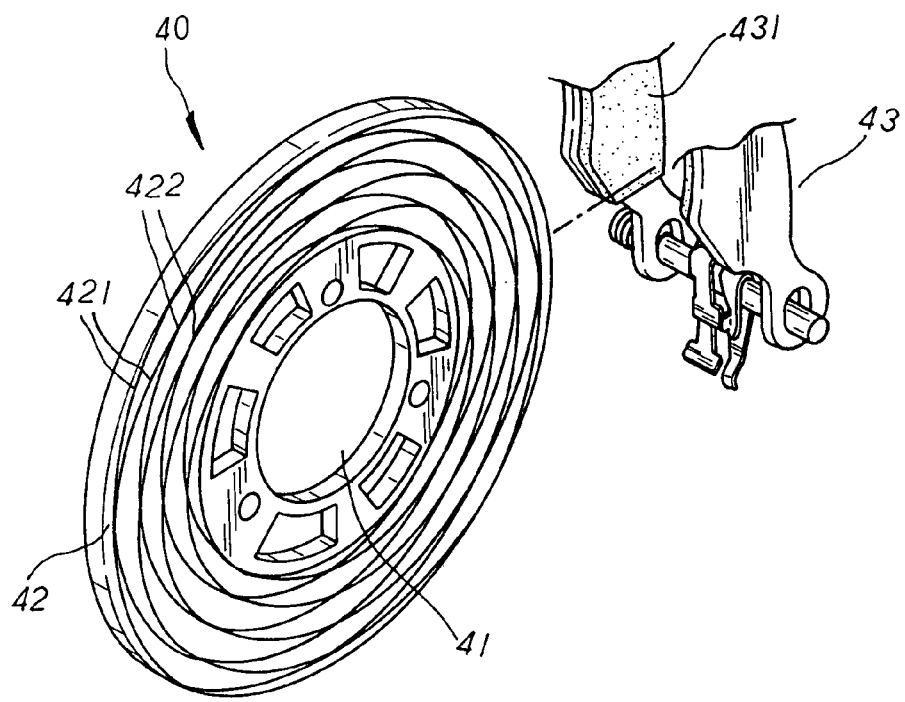
FIG. 5 is a perspective exploded view of the present invention applied onto a brake disk and worked with a brake-lining element.
Figure 4:
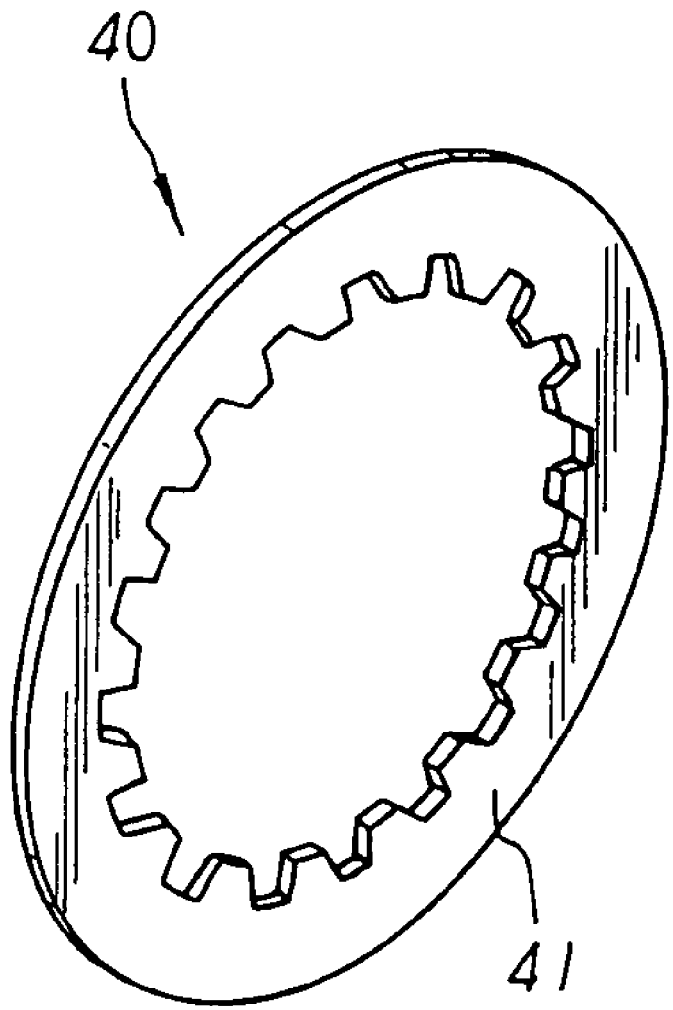
FIG. 4 is a perspective view of a conventional clutch disk of a step transmission clutch.

Please refer to FIG. 5. The present invention is related to a brake structure of vehicle, including a brake disk 40 having a shaft hole 41 disposed at the center thereof, and a brake abrasion surface 42 disposed at both lateral surfaces thereon respectively. The brake abrasion surface 42 of the brake disk 40 is equidistantly defined by a plurality of concentric crescent-shaped grooves 421 whose number is variably changed depending on the application thereof in practical use. The crescent-shaped grooves 421 thereof are partially overlapped at their ends to form a plurality of symmetrically intersecting points 422 at the brake abrasion surface 42 thereon. In braking operation, a brake-lining element 43 with lining plates 431 disposed thereon is applied to the brake disk 40 with the lining plates 431 thereof in abrasion engagement with the brake abrasion surface 42 thereof. Via the crescent-shaped grooves 421 abrasively abutted against the lining plates 431 thereof, the frictional coefficient is increased so as to achieve better balance effect of the lining plates 431 thereof, avoiding the slipping and deviating of the lining plates 431 in braking operation. Besides, when the lining plates 431 are abrasively contacted with the intersecting points 422 of the grooves 421 thereof, the frictional coefficient is relatively augmented to a great deal, efficiently shortening the braking distance as well as boosting the driving safety thereof.

Figure 6:
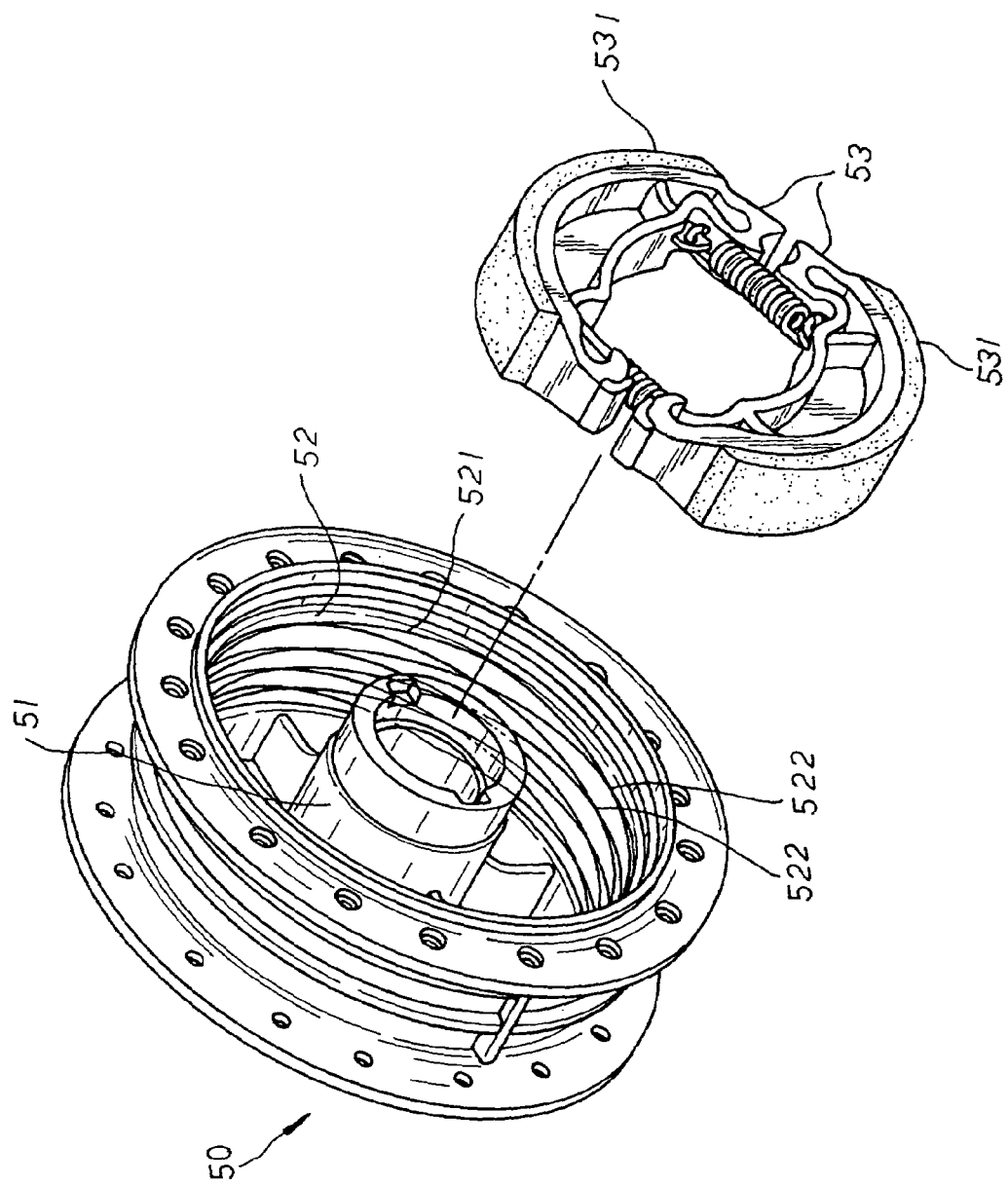
FIG. 6 is a perspective exploded view of the present invention applied onto a brake drum case and worked with a brake-shoe element.

Please refer to FIG. 6. The present invention is related to a brake structure of vehicle, including a brake drum case 50, a shaft tube 51 extending at the center of the brake drum case 50 thereof, and an annular brake abrasion surface 52 disposed at the inner periphery of the brake drum case 50 thereof. The brake abrasion surface 52 of the brake drum case 50 is equidistantly defined by a plurality of crescent-shaped grooves 521 whose number is variably changed depending on the application thereof in practical use. The crescent-shaped grooves 521 thereof are partially overlapped at their ends to form a plurality of symmetrically intersecting points 522 at the brake abrasion surface 52 thereon. In braking operation, a brake-shoe element 53 with lining plates 531 disposed thereon is applied to the brake drum case 50 with the lining plates 531 thereof in abrasion engagement with the brake abrasion surface 52 thereof. Via the crescent-shaped grooves 521 abrasively abutted against the lining plates 531, the frictional coefficient is increased so as to achieve better balance effect of the lining plates 531 thereof, avoiding the slipping and deviating of the lining plates 531 thereof in braking operation. Besides, when the lining plates 531 are abrasively contacted with the intersecting points 522 of the grooves 521 thereof, the frictional coefficient is relatively augmented to a great deal, efficiently shortening the braking distance as well as boosting the driving safety thereof.

Figure 7:
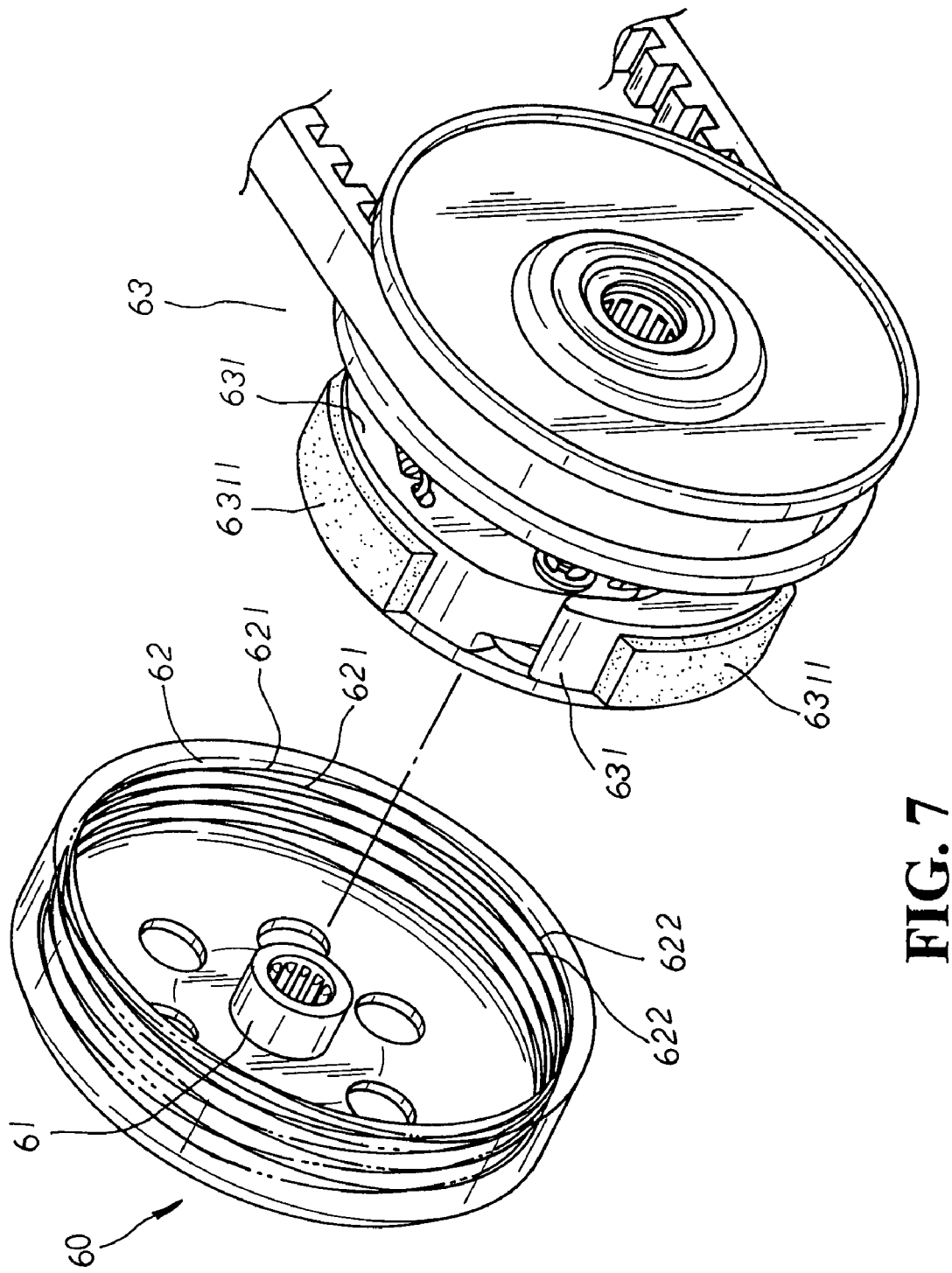
FIG. 7 is a perspective exploded view of the present invention applied onto a clutch housing of a stepless transmission clutch and worked with a driven belt gear unit.

Please refer to FIG. 7. The present invention is related to a brake structure of vehicle, including a clutch housing of a step-less transmission clutch 60, a shaft tube 61 extending at the center of the clutch housing 60 thereof, and a brake abrasion surface 62 disposed at the inner periphery of the clutch housing 60 thereon. The brake abrasion surface 62 thereof is equidistantly defined by a plurality of crescent-shaped grooves 621 whose number is variably changed depending on the application thereof in practical use. The crescent-shaped grooves 621 thereof are partially overlapped at their ends to form a plurality of symmetrically intersecting points 622 at the brake abrasion surface 62 thereon. In braking operation, a clutch brake-block 631 of a driven belt gear unit 63 is applied to the clutch housing 60 with lining plates 6311 of the clutch brake-block 631 thereof in abrasion engagement with the brake abrasion surface 62 thereof. Via the crescent-shaped grooves 621 abrasively abutted against the lining plates 6311, the frictional coefficient is increased so as to achieve better balance effect of the lining plates 6311 thereof, avoiding the slipping and deviating of the lining plates 6311 in braking operation. Besides, when the lining plates 6311 of the clutch brake-block 631 thereof are abrasively contacted with the intersecting points 622 of the grooves 622 thereof, the frictional coefficient is relatively augmented to a great deal, efficiently boosting the torque output of the stepless transmission clutch thereof.

Figure 8:
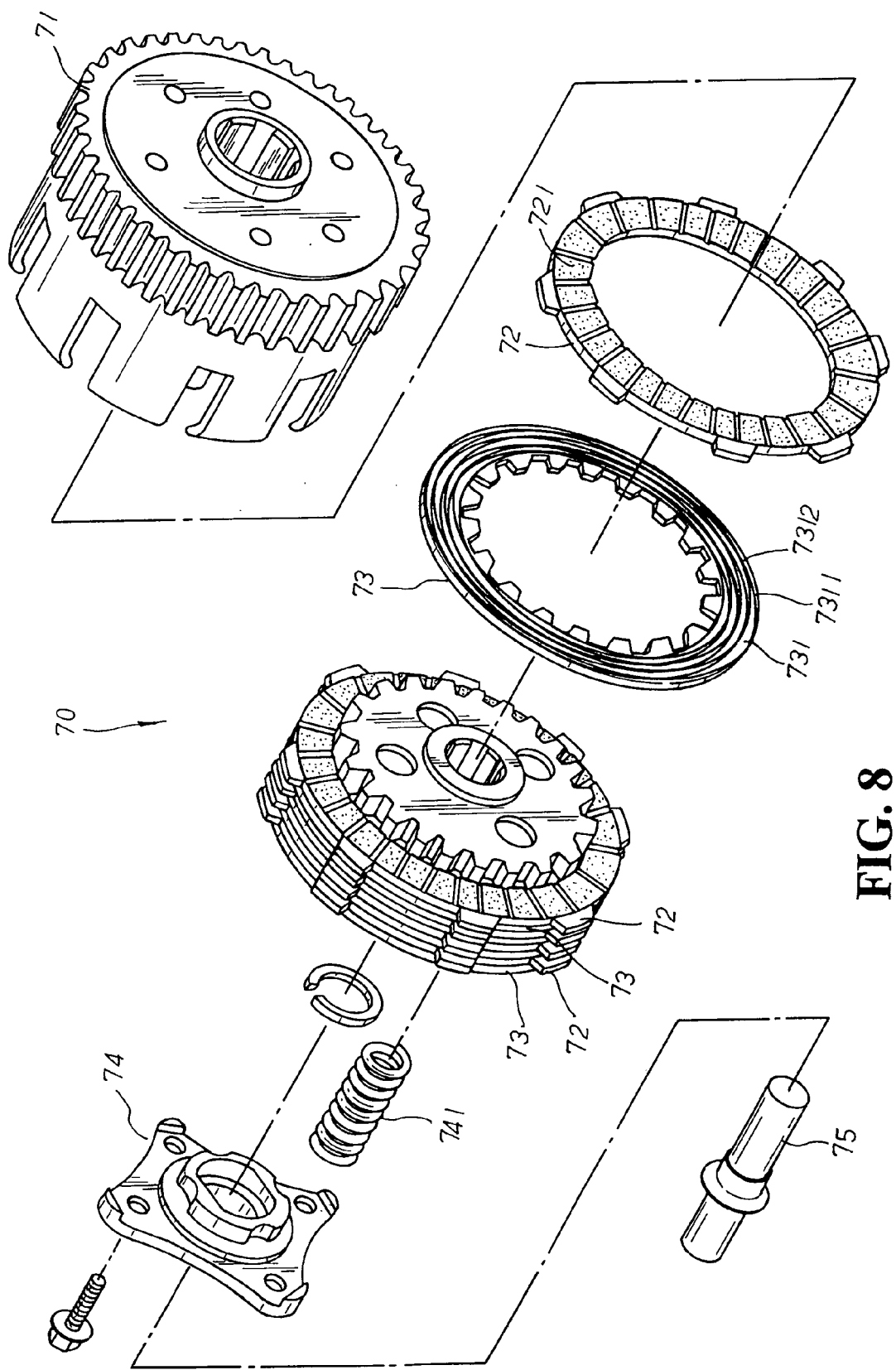
FIG. 8 is a perspective exploded view of the present invention applied onto a step transmission clutch.

Please refer to FIG. 8. The present invention is related to a brake structure of vehicle, including a step transmission clutch 70 mounted to one side of a flywheel 71. The step transmission clutch 70 thereof is made up of a plurality of ring washers 72 and clutch disks 73 which are flexibly abutted via a shaft bearing plate 74 with a pressure spring 7411 disposed thereon and engaged with a transmission case main shaft 75. Each of the ring washers 72 has a lining plate 721 disposed at both lateral sides thereon respectively, and each of the clutch disks 73 thereof, laminated at every two ring washers 72 there-between, has brake abrasion surfaces 731 disposed at both sides thereon in abrasive contact with the lining plates 721 of the ring washers 72 thereof. The brake abrasion surface 731 of the clutch disk 73 is equidistantly defined by a plurality of crescent-shaped grooves 7311 whose number is variably changed depending on the application thereof in practical use. The crescent-shaped grooves 7311 thereof are partially overlapped at their ends to form a plurality of symmetrically intersecting points 7312 at the brake abrasion surface 731 thereon. In braking operation, the ring washers 72 are driven by the flywheel 71 in braking contact with the brake abrasion surfaces 731 of the clutch disks 73. Via the crescent-shaped grooves 7311 abrasively abutted against the lining plates 721 of the ring washers 72 thereof, the frictional coefficient is increased so as to achieve better balance effect of the lining plates 721 thereof, avoiding slipping and deviating of the lining plates 721 in braking operation. Besides, when the lining plates 721 are abrasively contacted with the intersecting points 7321 of the grooves 7311 thereof, the frictional coefficient is relatively augmented to a great deal, efficiently increasing the torque output of the step transmission clutch 70 thereof.

What is claimed is:

1. A brake structure of a vehicle comprising:
   a) a brake abrasion surface having a plurality of rows of crescent-shaped grooves, each of the plurality of rows having a plurality of overlapping crescent-shaped grooves and a plurality of symmetrical intersecting points formed by the plurality of overlapping crescent-shaped grooves, each of the plurality of overlapping crescent-shaped grooves of each row of the plurality of rows of crescent-shaped grooves aligning with one of the plurality of overlapping crescent-shaped grooves of an adjacent row of the plurality of rows of crescent-shaped grooves; and
   b) a braking device having lining plates selectively engaging the plurality of overlapping crescent-shaped grooves of the brake abrasion surface.

2. The brake structure according to claim 1, wherein the braking device is selected from a group consisting of a brake disk, a brake drum case, a clutch housing of a stepless transmission clutch, and a clutch disk of a step transmission clutch.

* * * * *